(12) United States Patent  
Leuenberger

(10) Patent No.: US 7,055,512 B2
(45) Date of Patent: Jun. 6, 2006

(54) DEVICE AND METHOD FOR CHANGING ANGULAR VELOCITY OF AIRFLOW

(75) Inventor: Brian Leuenberger, Markdale (CA)

(73) Assignee: The Fuel Genie Corporation, Markdale (CA)

( * ) Notice: Subject to any disclaimer, the term of this patent is extended or adjusted under 35 U.S.C. 154(b) by 0 days.

(21) Appl. No.: 10/423,640

(22) Filed: Apr. 25, 2003

(65) Prior Publication Data

US 2004/0031471 A1 Feb. 19, 2004

Related U.S. Application Data

(60) Provisional application No. 60/403,888, filed on Aug. 16, 2002.

(51) Int. Cl.
F02M 29/00 (2006.01)

(52) U.S. Cl. ...................................... 123/590; 123/308

(58) Field of Classification Search ................ 123/590, 123/308
See application file for complete search history.

(56) References Cited

U.S. PATENT DOCUMENTS

| 4,318,386 | A | 3/1982 | Showalter et al. |
| 4,515,138 | A | 5/1985 | Agadi |
| 5,685,281 | A | 11/1997 | Li |
| 5,769,062 | A | 6/1998 | Antão |
| 5,947,081 | A | * 9/1999 | Kim ............................ 123/306 |
| 6,041,753 | A | * 3/2000 | Lin et al. ..................... 123/306 |
| 6,053,700 | A | 4/2000 | Fosdick |
| 6,227,185 | B1 | 5/2001 | Spracher |
| 6,247,460 | B1 | 6/2001 | Lindberg et al. |
| 6,258,144 | B1 | 7/2001 | Huang |
| 6,315,518 | B1 | 11/2001 | Uematsu et al. |
| 6,318,960 | B1 | 11/2001 | Kuwabara et al. |
| 6,354,798 | B1 | 3/2002 | Deckers |
| 6,358,003 | B1 | 3/2002 | Schlechtriem |
| 6,358,012 | B1 | 3/2002 | Staubach |
| 6,371,068 | B1 | 4/2002 | Taylor |

FOREIGN PATENT DOCUMENTS

| CH | 186180 | 8/1936 |
| GB | 223492 | 10/1924 |
| WO | WO 94/02735 | 2/1994 |
| WO | WO 98/48155 | * 10/1998 |

* cited by examiner

Primary Examiner—Thomas Denion
Assistant Examiner—Zelalem Eshete
(74) Attorney, Agent, or Firm—Hodgson Russ LLP

(57) ABSTRACT

A device for changing the angular velocity of airflow may be placed in the air intake line of an internal combustion engine. The device may be constructed from one or more stationary fins. The fins may be curved so that as air passes from a first edge of the fin, past a second edge of the fin, the air moves in a curvilinear or vortical path.

32 Claims, 8 Drawing Sheets

DEVICE AND METHOD FOR CHANGING ANGULAR VELOCITY OF AIRFLOW

CROSS-REFERENCE TO RELATED APPLICATION

This application claims the benefit of priority to U.S. provisional patent application Ser. No. 60/403,888, filed on Aug. 16, 2002, now abandoned, which is incorporated herein by reference.

FIELD OF THE INVENTION

The present invention relates to changing the angular velocity of airflow. In an embodiment of the invention, the angular velocity of airflow supplied to an internal combustion engine is changed.

BACKGROUND OF THE INVENTION

In most internal combustion engines, ambient air is mixed with fuel, and the air/fuel mixture is introduced into the working cylinder portion of the engine.

It is known to add a "velocity stack" or "air horn" to a carburetor or fuel injector. A "velocity stack" is often a cone-shaped device that is open to the outside and directs airflow to the air-fuel system. The velocity stack has a relatively large inlet opening and a relatively small outlet opening.

As described in U.S. Pat. No. 6,371,068, an adjustable vane may also be included in the air horn, in the air intake port of the cylinder head, or in both. In one known engine design, the vane in the air intake passageway of the cylinder head gradually twists so that the cross-sectional area of the air intake passageway gradually narrows toward the inlet port of the cylinder. Therefore, the primary effect of the vane is to change the direction of the airflow.

An embodiment of the invention provides an air intake system for an internal combustion engine that includes a modification in the path of the air flow leading to the engine.

SUMMARY OF THE INVENTION

An embodiment of the invention is a device which may be placed in the air intake line of an internal combustion engine for changing the angular velocity of the air traveling through the air intake line. The device may be constructed from one or more stationary fins. The fins may be curved so that as air passes from a first edge of the fin, past a second edge of the fin, the air moves in a curvilinear or vortical path.

Another embodiment of the invention is an internal combustion engine having a device as described herein. Still another embodiment of the invention includes a method of operating an internal combustion engine comprising passing air or an air/fuel mixture by a device as described herein.

Other objects and advantages of the present invention will become apparent from the following detailed description when read in conjunction with the accompanying drawings.

BRIEF DESCRIPTION OF THE DRAWINGS

An embodiment of the invention is illustrated in the drawings in which like reference characters designate the same or similar parts throughout the figures of which.

DETAILED DESCRIPTION OF THE INVENTION

Figure 1:
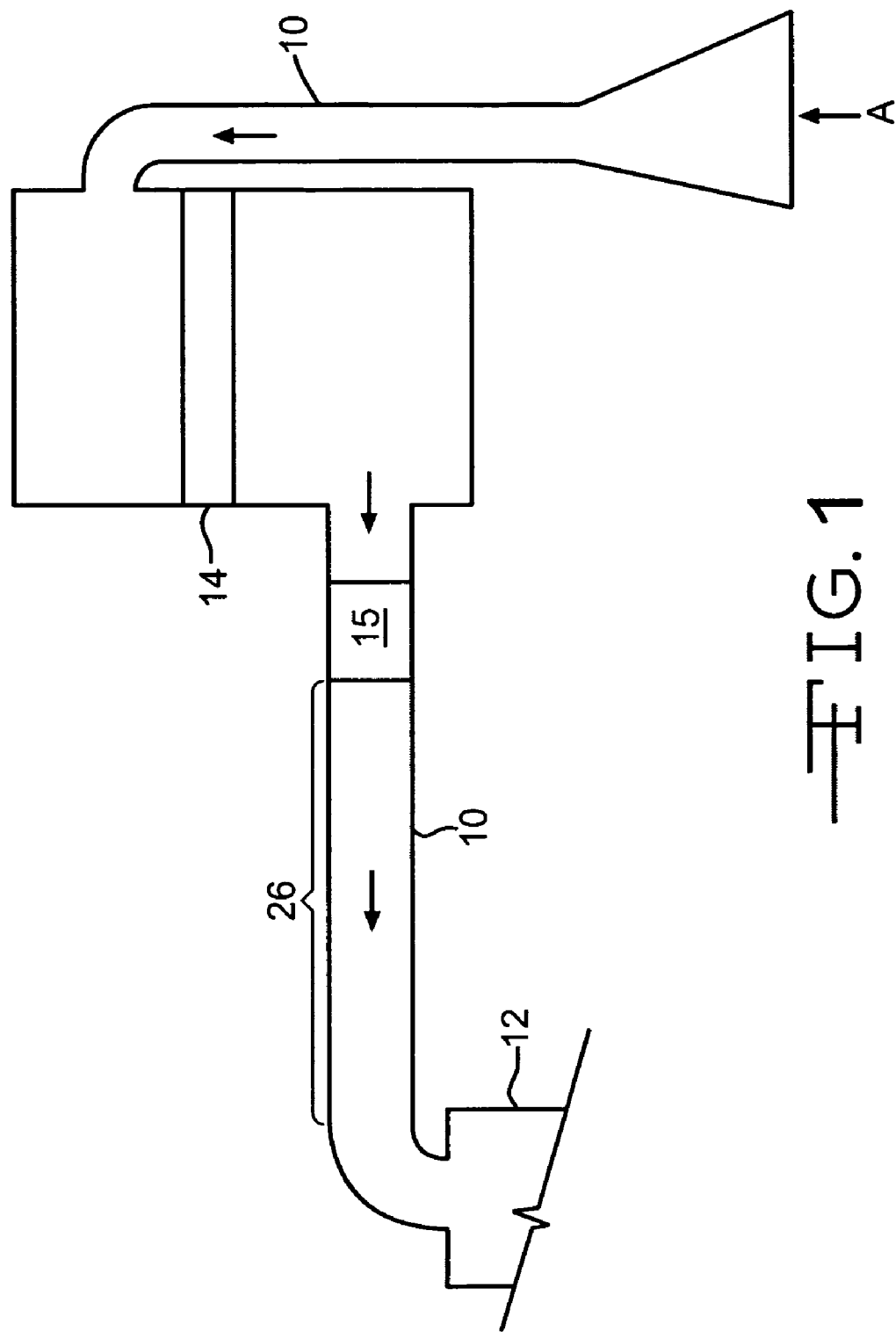
FIG. 1 is a schematic of an air delivery system for an internal combustion engine in accordance with the invention.

The schematic of FIG. 1 shows a possible location for a device 15, in accordance with an embodiment of the invention, installed in an air intake line 10 of an internal combustion engine. The device 15 may be installed in any type of internal combustion engine, i.e., any type of reciprocating or rotary engine. Typically, the device 15 may be installed in a gasoline or diesel-powered engine. However, the device 15 may also be installed in other types of fuel-powered internal combustion engines, such as those fueled by compressed natural gas, hydrogen, propane, or other types of fuel. The air intake line 10 receives air from outside the engine and guides the air toward a combustion chamber 12, such as a cylinder. An air filter 14 may also be installed in the air intake line 10 to remove particulate matter from the air. In an embodiment of the invention, the device 15 is located in the air intake line 10 between the air filter 14 and the combustion chamber 12, although the device 15 may be placed anywhere upstream of the combustion chamber 12, with respect to the airflow. The device 15 is located so as to be capable of changing the angular velocity of air into the combustion chamber 12 of the internal combustion engine.

Figure 2:
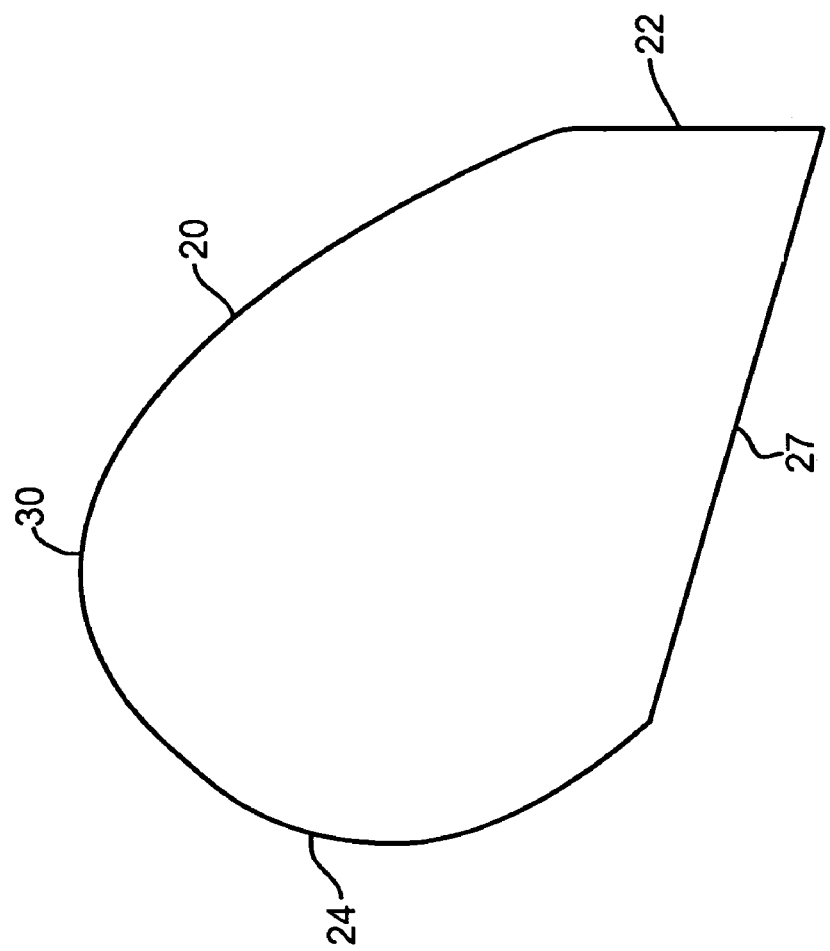
FIG. 2 is a side plan view of a single fin of a device in accordance with one embodiment of the invention.
Figure 3:
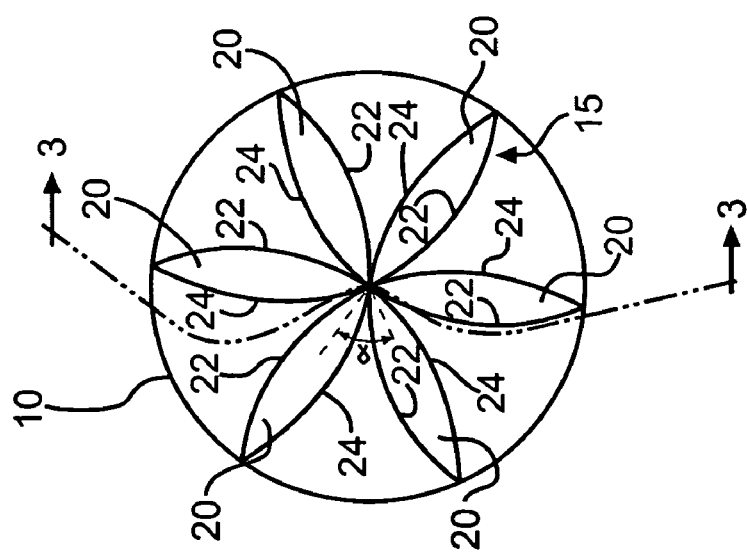
FIG. 3 is a front view of a device in accordance with one embodiment of the invention, viewed along a longitudinal axis of the air intake line in the direction of the airflow.

A device 15, in accordance with one embodiment of the invention, is shown in FIGS. 2–5. Looking longitudinally down the air intake line 10 in the direction of the airflow A, as indicated in FIG. 1, i.e., toward the combustion chamber 12, the device 15 is shown as having one or more stationary fins 20. A fin 20 may be shaped and oriented relative to the airflow direction A so that air traveling through the air intake line 10 toward the combustion chamber 12 passes a first edge 22 of the fin 20 and travels toward a second edge 24 of the fin 20. The device 15 may be configured and oriented to cause the air to flow along a curvilinear path within the air intake line 10. As shown in FIG. 3, the fin 20 may be curved so that the air passing from the first edge 22 toward the second edge 24 moves in a counter-clockwise direction with respect to the direction of the airflow through the air intake line 10. The air moves from a first angular position at the first edge 22 of the fin 20 to a second angular position at the second edge 24 of the fin 20. It is believed that the device 15 may cause the air traveling through the air intake line 10 toward the combustion chamber 12 to form a vortex downstream 26 from the device 15. Although the device 15 is shown by example as imparting a counter-clockwise rotation of air in the air intake line 10, it will be understood that the fins 20 of the device 15 may be curved so as to impart a clockwise rotation of air.

Figure 4:
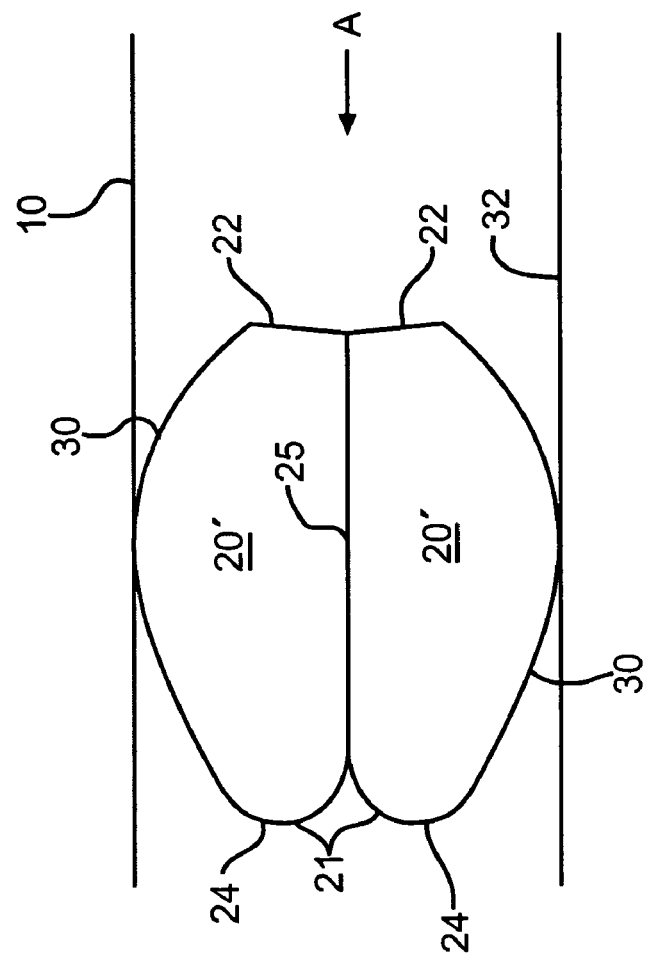
FIG. 4 is a cross sectional view of one embodiment of the device taken along line 3—3 of FIG. 3.
Figure 5:
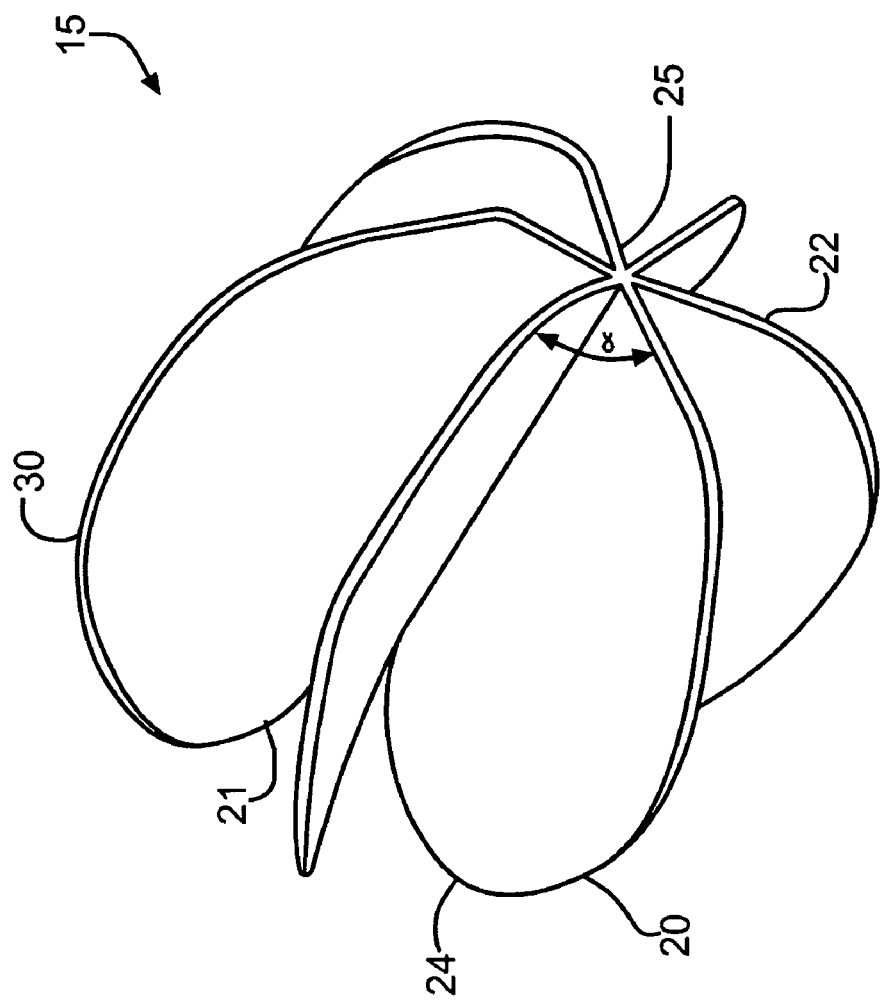
FIG. 5 is a perspective view of the device in accordance with one embodiment of the invention.

FIG. 2 shows a side plan view of a single fin 20 in accordance with the present invention. The first edge 22 may be generally straight and may lie generally perpendicular to the airflow A when the device 15 is installed in the air intake line 10. The fin 20 may be attached to one or more other fins 20, along a connecting edge 27, at a central location 25. The fin 20 may be asymmetrical in that it is narrow toward the first edge 22, wider toward the middle, and narrow again toward the second edge 24 of the fin 20. The fin 20 may also be undercut 21 toward the second edge 24, which is believed to cause a vortical motion of the air downstream 26 from the device 15. This can best be seen in FIGS. 2 and 4. As best seen in FIG. 5, the fin 20 may be curved toward its second edge 24, which causes the air to flow in a curvilinear manner. As the fin 20 curves toward its second edge 24, it may also be somewhat concave in shape causing a dishing effect which may further enhance the vortical motion of the air downstream from the device 15.

In one embodiment of the invention, the device 15 may be made from a plurality of fins 20 having a generally similar shape. Each of the plurality of fins 20 may be attached along a connecting edge 27, at a central location 25, as shown in FIG. 4, to fix the position of each fin 20 relative to the other fins 20. Each of the fins 20 may be positioned so as to evenly divide the space bounded by the inner surface 32 of the air intake line 10. At least two of the fins 20 may be sized to contact the inner surface 32 of the air intake line 10. These fins are herein designated "contacting fins" and are represented in FIG. 4 by reference numeral 20'. The contacting fins 20' may have a contact edge 30, at least a portion of which contacts the inner surface 32 of the air intake line 10 to form a friction fit or interference fit with the inner surface 32 so as to hold the device 15 stationary relative to the air intake line 10. In this manner, the device 15 may be insertable into the air intake line 10. The device 15 is cost efficient because it may be mass produced and installed in the air intake line 10 after production of the engine. This thus makes device 15 suitable for the automobile parts aftermarket. The device 15 does not have to be manufactured into the air intake line 10 at the time the engine is manufactured.

A specific example of a first embodiment of the device is shown in FIGS. 3 and 5. Six fins 20, generally similar in shape, may be attached to each other at a central location 25. The fins 20 may be radially attached along the connecting edge 27 at the central location 25 so that they evenly divide the space bounded by the inner surface 32 of the air intake line 10. Each fin 20 may be offset from the next closest fin at an angle α, shown in FIGS. 3 and 5, the angle α being approximately 60° in the specific example discussed herein. The outside diameter of the device 15 may be about 2.625 inches. Also, the fins 20 may be made from a plastic material having a thickness of about 0.05 inches. It is believed that a plastic material will be suitable because it may be formed to flex sufficiently to allow the device to be inserted into the air intake line 10 by hand, and yet not move substantially within the air intake line 10 when air is flowing through the air intake line 10. Furthermore, a plastic material will not rust. However, a metal or other material may also be suitable for construction of the device 15.

As the inventive device 15 is directed at changing the angular velocity of the air traveling through the air intake line 10 toward the combustion chamber 12, it is believed that the device 15 will result in more power being produced by the engine and that better fuel efficiency will result.

Figure 6A:
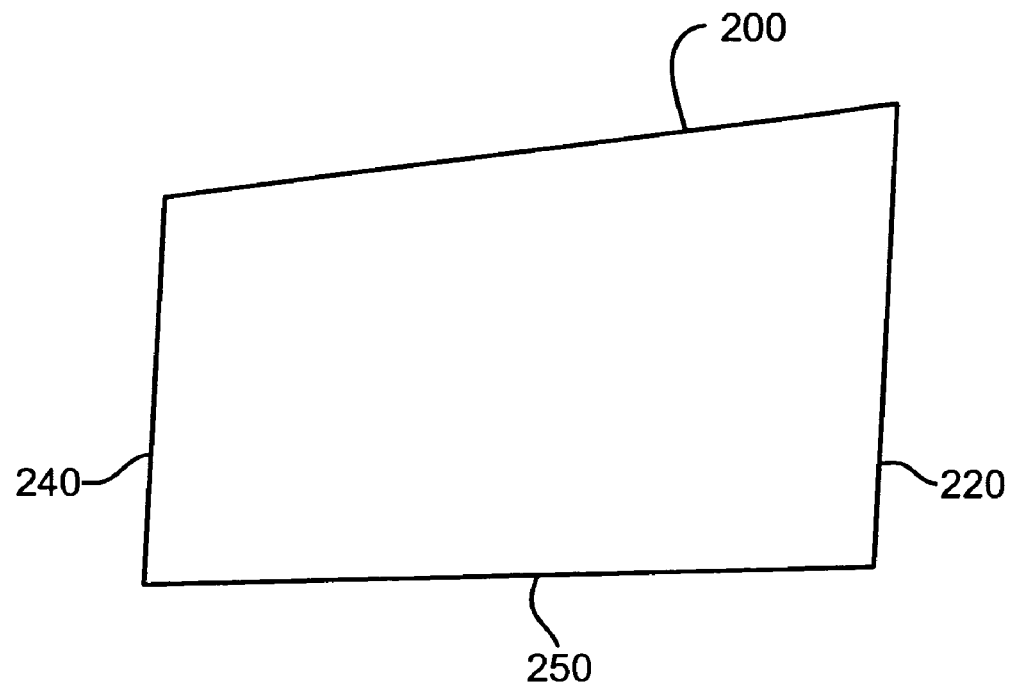
FIG. 6a is a side plan view of a single fin of a device in accordance with a second embodiment of the invention.
Figure 6B:
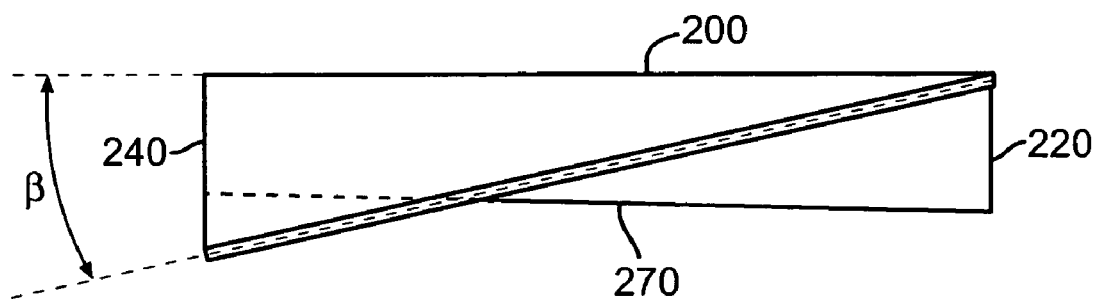
FIG. 6b is a side elevational view of a single fin of a device in accordance with a second embodiment of the invention.
Figure 7:
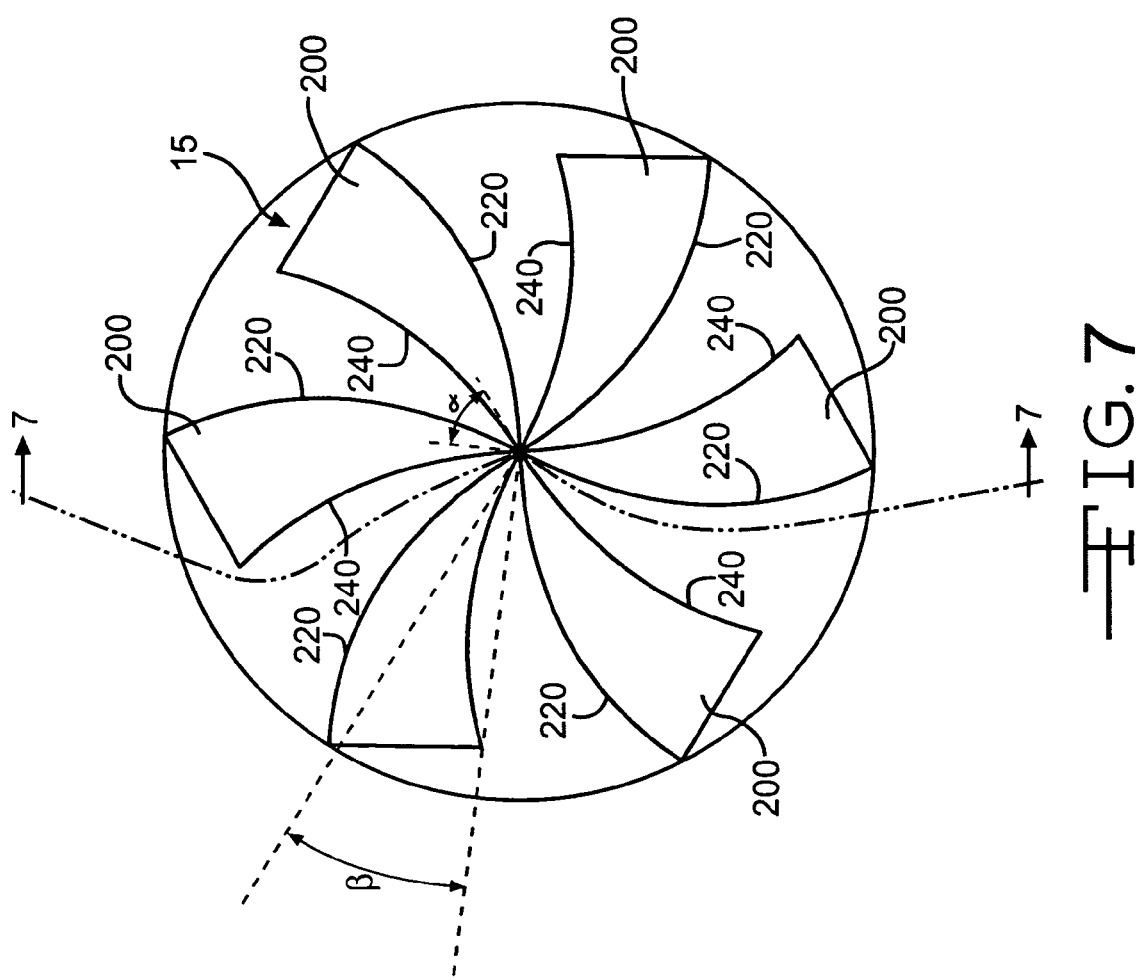
FIG. 7 is a front view of a device in accordance with a second embodiment of the invention, viewed along a longitudinal axis of the air intake line in the direction of the airflow.

A second embodiment of the device 15 is shown in FIGS. 6a–9. The device 15 may be installed in the air intake line 10 of an internal combustion engine, as shown in FIG. 1. Looking longitudinally down the air intake line 10 in the direction of the airflow A, as also indicated in FIG. 1, toward the combustion chamber 12, the device 15 is shown as having one or more stationary fins 200. As with the first embodiment of the invention, described above, a fin 200 may be shaped and oriented relative to the airflow direction A (shown in FIG. 8) so that air traveling through the air intake line 10 toward the combustion chamber 12 passes a first edge 220 of the fin 200 and travels toward a second edge 240 of the fin 200. The device 15 may be configured and oriented to cause the air to flow along a curvilinear path within the air intake line 10. As shown in FIG. 7, the fin 200 may be curved so that the air passing from the first edge 220 toward the second edge 240 moves in a counter-clockwise direction with respect to the direction of the airflow through the air intake line 10. The air moves from a first angular position at the first edge 220 of the fin 200 to a second angular position at the second edge 240 of the fin 200. It is believed that the second embodiment of the device 15 may also cause the air traveling through the air intake line 10 toward the combustion chamber 12 to form a vortex downstream 26 from the device 15. Although the second embodiment of the device 15 is shown by example as imparting a counter-clockwise rotation of air in the air intake line 10, it will be understood that the fins 200 of the device 15 may be curved so as to impart a clockwise rotation of air.

Figure 8:
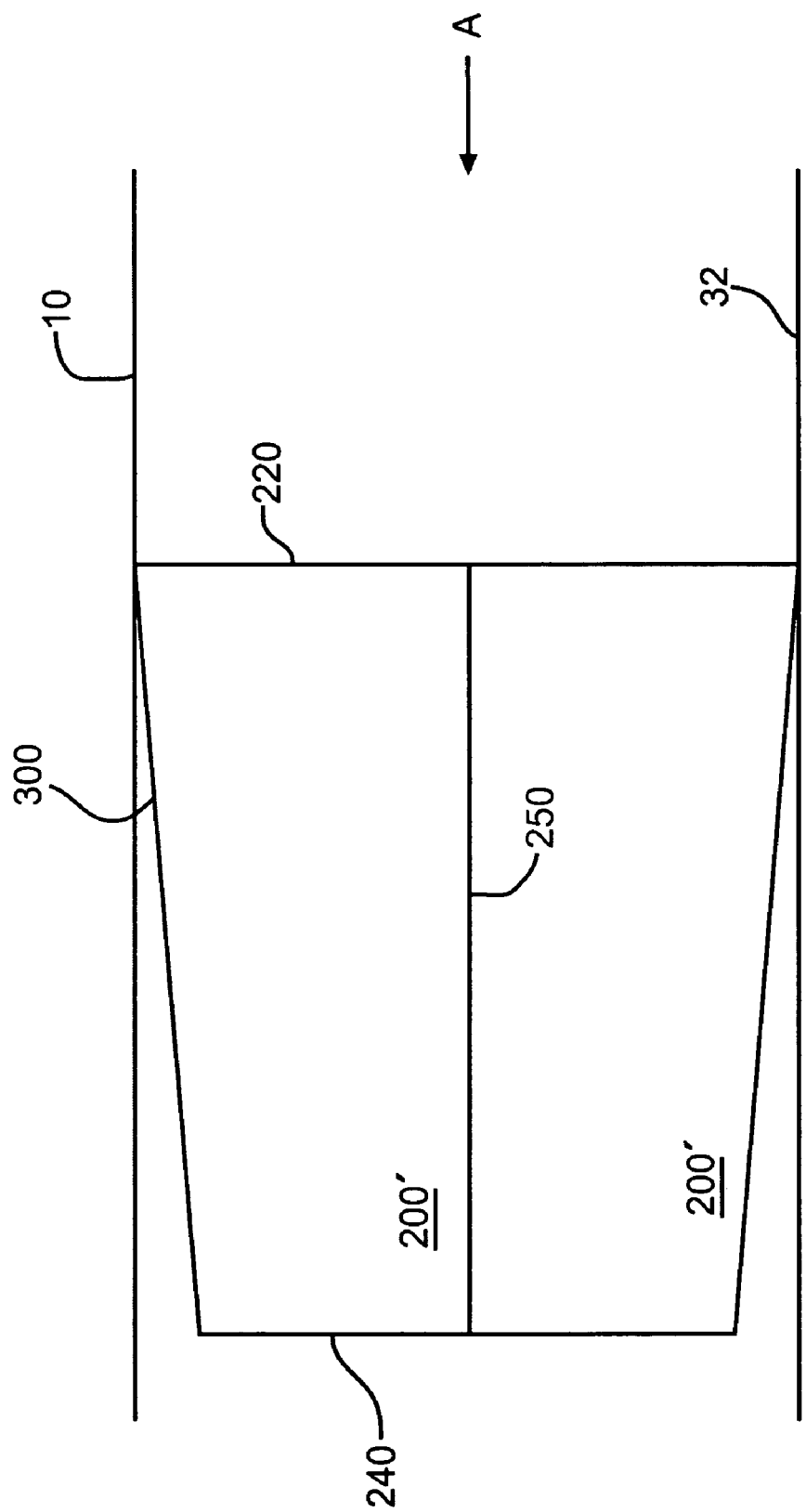
FIG. 8 is a cross sectional view of a second embodiment of the device taken along line 7—7 of FIG. 7.
Figure 9:
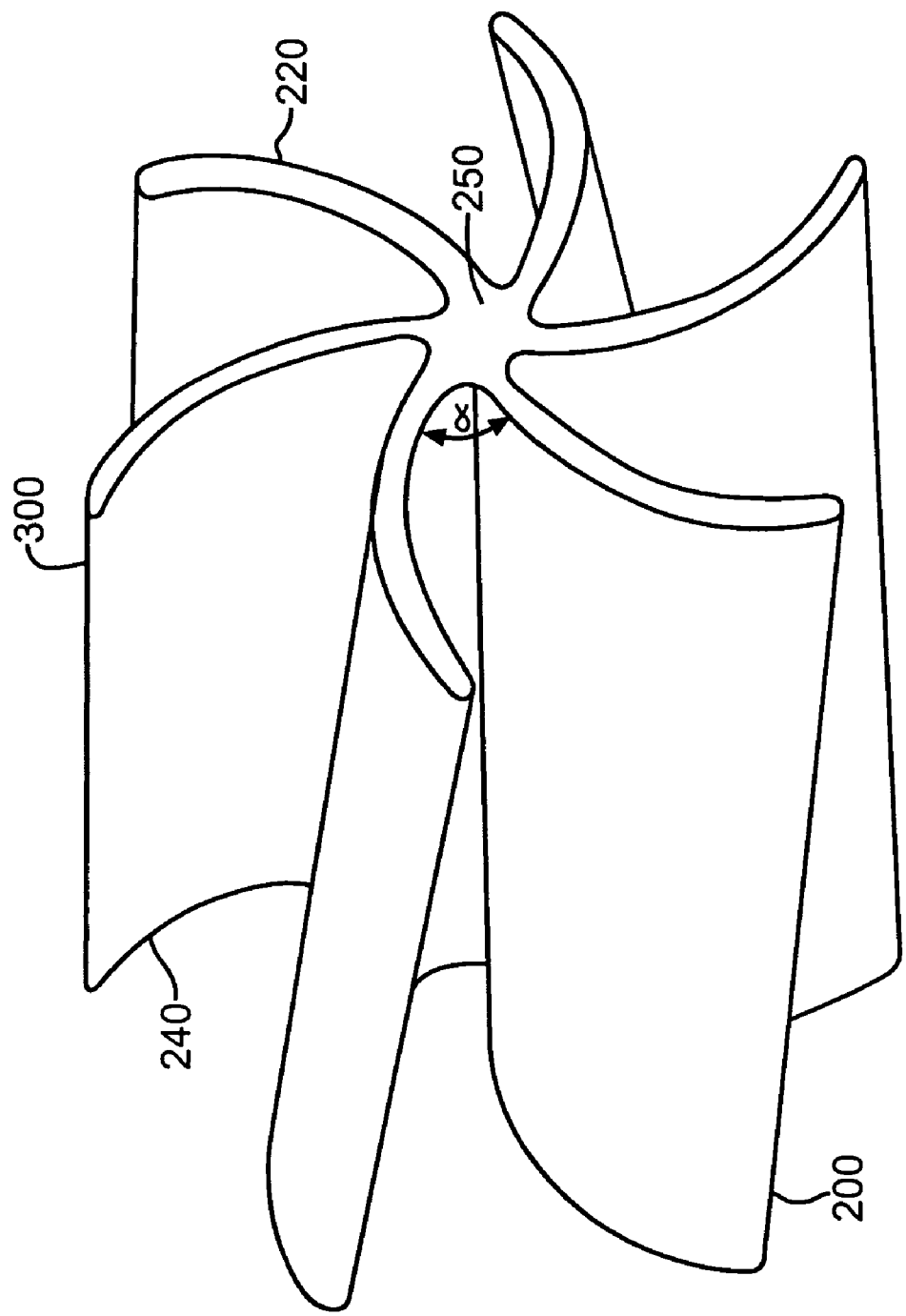
FIG. 9 is a perspective view of the device in accordance with a second embodiment of the invention.

A side plan view of a single fin 200 is shown in FIG. 6a, in accordance with the second embodiment of the invention. The fin 200 may be asymmetrical in shape and may appear generally trapezoidal in shape, as viewed from the side. Both the first edge 220 and the second edge 240 of the fin 200 may be generally straight and lie generally perpendicular to the direction of airflow A when the device 15 is installed in the air intake line 10. The fin 200 may narrow from the first edge 220 toward the second edge 240, in the direction of the airflow A. Generally, the diameter of the device 15 may be about ½ inch narrower at the second edge 240 than at the first edge 220. This can best be seen in FIGS. 6a and 8. As air travels toward the combustion chamber 12, it first passes the first edge 220 of the fin 200 and then passes the second edge 240 of the fin 200. As best seen in FIGS. 6b, 7 and 9, the fin 200 may be curved toward the second edge 240, which causes the air to flow in a curvilinear manner. The amount of curvature, or the offset, from the first edge 220 to the second edge 240 of the fin 200 is indicated by angle β in FIGS. 6b and 7. As the fin 200 curves toward its second edge 240, it may also be somewhat concave in shape causing a dishing effect which is believed to further enhance the vortical motion of the air downstream from the device 15.

In the second embodiment, the device 15 may be made from a plurality of fins 200 having a generally similar shape. Each of the plurality of fins 200 may be attached along a connecting edge 270 at a central location 250, as shown in FIGS. 7 and 8, to fix the position of each fin 200 relative to the other fins 200. Each of the fins 200 may be positioned so as to evenly divide the space bounded by the inner surface 32 of the air intake line 10. At least two of the fins 200 may be sized to contact the inner surface 32 of the air intake line 10. These fins are herein designated "contacting fins" and are represented in FIG. 8 by reference numeral 200'. The contacting fins 200' may have a contact edge 300, at least a portion of which contacts the inner surface 32 of the air intake line 10 to form a friction fit or interference fit with the inner surface 32 so as to hold the device 15 stationary relative to the air intake line 10. In this manner, as with the first embodiment described above, the device 15 may be insertable into the air intake line 10. The second embodiment of the device 15 may also be cost efficient because it may be installed in the air intake line 10 after production of the engine. The inventive device 15 does not have to be manufactured into the air intake line 10 at the time the engine is manufactured.

FIGS. 7 and 9 show a specific example of the second embodiment of the device 15. Six fins 200, generally similar in shape, may be attached to each other along the connecting edge 270 at a central location 250. The fins 200 may be radially attached at the central location 250 so as to evenly divide the space bounded by the inner surface 32 of the air intake line 10. Each fin 200 may be offset from the next closest fin at an angle α, shown in FIGS. 7 and 9, the angle α being approximately 60° in the specific example discussed herein. As also seen in FIGS. 6b, 7 and 9, the fin 200 may be curved from the first edge 220 toward the second edge 240, which causes the air to flow in a curvilinear manner. The offset, angle β, from the first edge 220 to the second edge 240 of the fin 200 is approximately 30 degrees in the specific example discussed herein, but may vary by about ±5 degrees. The angle β may vary depending upon manufacturing methods. The outside diameter of the device 15 may vary between about 2 inches to about 5 inches. The outside diameter may be embodied to have varying diameters so that is can be inserted into the air intake line 10 of any size engine. Also, the fins 200 may be made from a plastic material having a thickness of about 0.05 inches or less. The thickness of the fins varies due to the manufacturing process. In this specific example, the device may be injection molded. It is believed that a plastic material will be suitable because it may be formed to flex sufficiently to allow the device to be inserted into the air intake line 10 by hand, and yet not move substantially within the air intake line 10 when air is flowing through the air intake line 10. Furthermore, a plastic material will not rust. However, a metal or other material may also be suitable for construction of the device 15.

As the device 15 is directed at changing the angular velocity of the air traveling through the air intake line 10 toward the combustion chamber 12, it is believed that the inventive device 15 will result in more power being produced by the engine and that better fuel efficiency will result.

While the device and method for changing angular velocity of airflow has been described in connection with certain embodiments, the description is not intended to limit the scope of the invention to the particular forms set forth, but, on the contrary, it is intended to cover such alternatives, modifications, and equivalents as may be included within the spirit and scope of the invention, as defined by the appended claims.

What is claimed is:

1. An angular velocity changing device arranged in an air intake line of an internal combustion engine comprising:
   a) one or more curved fins;
   b) each of the one or more curved fins being generally similar in shape and comprising a first edge and a second edge, the first edge aligned generally perpendicular to a direction of airflow and comprising a length that is greater than a length of the second edge;
   c) each of the one or more curved fins having a connecting edge, the fins being attached to each other at a central location along the connecting edge, each of the one or more curved fins being offset from the next fin at a first angle so as to evenly divide a space inside the air intake line;
   d) each of the one or more curved fins being curved from the first edge to the second edge at a second angle;
   e) at least two fins having a contact edge distal to the connecting edge configured to contact the air intake line and hold the device in a stationary position; and
   f) each of the one or more curved fins being configured to change the angular velocity of air traveling in the air intake line.

2. The angular velocity changing device of claim 1, wherein the length of the first edge is ¼ inch larger than the length of the second edge.

3. The angular velocity changing device of claim 1, wherein the first angle is 60 degrees.

4. The angular velocity changing device of claim 1, wherein the second angle is 30 degrees.

5. The angular velocity changing device of claim 1, wherein the second angle is about 25 degrees to about 35 degrees.

6. The angular velocity changing device of claim 1, wherein the fins are made of plastic.

7. The angular velocity changing device of claim 1, wherein the fins are made of metal.

8. The angular velocity changing device of claim 1, wherein the angular velocity of the air is changed so as to move in a curvilinear manner downstream of the device.

9. An angular velocity changing device, comprising one or more curved fins arranged in an air intake line of an internal combustion engine, each of the one or more curved fins being generally similar in shape and having a connecting edge wherein the fins are attached to each other at a central location along the connecting edge, the fins being attached to each other at an angle so as to evenly divide a space inside the air intake line, wherein each fin has a first edge and a second edge, the first edge aligned generally perpendicular to a direction of airflow in the air intake line, wherein air traveling in the air intake line passes the first edge of each fin and moves toward the second edge of each fin, at least two fins having a contact edge distal to the connecting edge configured to contact the air intake line and hold the device in a stationary position, wherein each of the one or more curved fins is curved from the first edge to the second edge, and wherein the fins are configured to change the angular velocity of air moving past the device.

10. The device of claim 9, wherein the angle is approximately 60 degrees.

11. The device of claim 9, wherein the fins are asymmetrical in shape.

12. The device of claim 9, wherein the fins are made of plastic.

13. The device of claim 9, wherein the fins are made of metal.

14. The device of claim 9, wherein the angular velocity of the air is changed so as to move in a curvilinear manner downstream of the device.

15. A method of changing the angular velocity of an air molecule traveling in an air intake line of an internal combustion engine, comprising the acts of:
   placing one or more curved fins in the air intake line, each fin having a first edge and a second edge, the first edge aligned generally perpendicular to a direction of airflow, the first edge being in a location within the air intake line that is further from a combustion chamber of the engine than the second edge, and wherein each of the one or more curved fins is curved from the first edge to the second edge;

attaching each of the fins to each other at a central location along a connecting edge;

attaching the fins to each other at an angle so as to evenly divide a space inside the air intake line;

providing two or more fins having a contact edge distal to the connecting edge configured to contact the air intake line and hold the fins in a stationary position; and forcing air to move from the first edge toward the second edge to change the angular velocity of the air.

16. The method of claim 15, wherein the act of attaching the fins further comprises the act of providing the angle to be about 60 degrees.

17. The method of claim 15, comprising the further act of providing fins having an asymmetrical shape.

18. The method of claim 15, comprising the further act of constructing the fins from a plastic material.

19. The method of claim 15, comprising the further act of constructing the fins from a metal material.

20. The method of claim 15, comprising the further act of changing the angular velocity of the air so as to move in a curvilinear manner downstream of the fins.

21. An air intake line for an internal combustion engine, the air intake line comprising:

a first end for receiving air;

a second end opposite the first end which outlets to a combustion chamber of the engine; and at least one curved fin, the fin having a first edge, a second edge, and a connecting edge, the first edge located toward the first end of the air intake line and aligned generally perpendicular to a direction of airflow, and the second edge located toward the second end of the air intake line, the at least one curved fin being curved from the first edge to the second edge;

wherein the fins are generally similar in shape and are attached to each other at a central location along the connecting edge, the fins being attached to each other at an angle so as to evenly divide a space inside the air intake line;

wherein the fins have a contact edge distal to the connecting edge configured to contact an inside surface of the air intake line in order to hold the fins in a stationary position within the air intake line; and wherein the fins are configured to change the angular velocity of the air flowing from the first end of the air intake line toward the second end of the air intake line.

22. The air intake line of claim 21, wherein the angle is approximately 60 degrees.

23. The air intake line of claim 21, wherein the fins are asymmetrical in shape.

24. The air intake line of claim 21, wherein the fins are made of plastic.

25. The air intake line of claim 21, wherein the fins are made of metal.

26. The air intake line of claim 21, wherein the angular velocity of the air is changed so as to move in a curvilinear manner downstream of the fins.

27. An internal combustion engine comprising:

an air intake line;

a combustion chamber; and one or more curved fins located in the air intake line, the fins having a first edge and a second edge, the fins being curved from the first edge to the second edge, the fins being attached to each other at a central location along a connecting edge, the fins being attached to each other at an angle so as to evenly device a space inside the air intake line, wherein at least two fins have a contact edge distal to the connecting edge configured to contact an inside surface of the air intake line in order to hold the fins in a stationary position within the air intake line; and wherein the fins are configured to change the angular velocity of air flowing through the air intake line toward the combustion chamber.

28. The internal combustion engine of claim 27, wherein the angle is approximately 60 degrees.

29. The internal combustion engine of claim 27, wherein the fins are asymmetrical in shape.

30. The internal combustion engine of claim 27, wherein the fins are made of plastic.

31. The internal combustion engine of claim 27, wherein the fins are made of metal.

32. The internal combustion engine of claim 27, wherein the angular velocity of the air is changed so as to move in a curvilinear manner downstream of the fins.

* * * * *